(12) United States Patent
Schmidt

(10) Patent No.: US 10,236,820 B2
(45) Date of Patent: Mar. 19, 2019

(54) MODULAR PHOTOVOLTAIC LIGHT AND POWER CUBE

(71) Applicant: Robert F. Schmidt, Pittsboro, NC (US)

(72) Inventor: Robert F. Schmidt, Pittsboro, NC (US)

(73) Assignee: Daniel L. Robertson, Raleigh, NC (US)

( * ) Notice: Subject to any disclaimer, the term of this patent is extended or adjusted under 35 U.S.C. 154(b) by 0 days.

(21) Appl. No.: 15/349,660

(22) Filed: Nov. 11, 2016

(65) Prior Publication Data

US 2017/0141721 A1    May 18, 2017

Related U.S. Application Data

(60) Provisional application No. 62/254,997, filed on Nov. 13, 2015.

(51) Int. Cl.
  *F21S 8/08* (2006.01)
  *F21S 9/03* (2006.01)
  (Continued)

(52) U.S. Cl.
  CPC .............. *H02S 10/40* (2014.12); *F21S 9/032* (2013.01); *F21V 21/22* (2013.01); *H02J 3/383* (2013.01);
  (Continued)

(58) Field of Classification Search
  CPC .......... H02S 10/12; H02S 10/40; H02S 20/30; H02S 20/32; H02S 30/10; H02S 30/20; H02S 40/30; Y02E 10/50; F21S 9/032
  See application file for complete search history.

(56) References Cited

U.S. PATENT DOCUMENTS 5,429,496 A * 7/1995 Stephens ................. F23G 7/085
                                                        431/202
6,393,769 B1   5/2002 Mertik et al.
(Continued)

FOREIGN PATENT DOCUMENTS

CA          2747769 A1      1/2013

OTHER PUBLICATIONS

International Search Report and Written Opinion issued for International Application No. PCT/US16/61585, dated Jan. 24, 2017.
(Continued)

*Primary Examiner* — Lindsey A Bernier
(74) *Attorney, Agent, or Firm* — Meunier Carlin & Curfman LLC

(57) ABSTRACT

Submitted is a modular stationary portable photovoltaic solar powered electrical generation, storage and supply device and light tower. The device consists of an elongated cube or rectangular prism shaped support structure with a flat base, flat sides and a flat decked top to form a protective crate shaped module when the various components, such as the solar panel arrays, telescoping mast, and light assembly or outriggers of the device are retracted to where the boundaries may be defined by the perimeters of the cube or prism. This modular design can allow for the modules to be stored, loaded, or shipped quickly, efficiently, and in greater quantities on flatbeds, in shipping containers, in warehouses, and other settings and modes where they can not only be packed end to end and side to side with no unused space, but can also be stacked up to three modules high for significantly higher storage density.
The interconnectivity of multiple modules to create incrementally larger power generation, storage and distribution systems provides an easily adaptable solution to larger temporary power demands.

19 Claims, 3 Drawing Sheets

(51) Int. Cl.
| | |
|---|---|
| *H02J 3/38* | (2006.01) |
| *F21V 21/22* | (2006.01) |
| *H02S 10/40* | (2014.01) |
| *H02S 20/30* | (2014.01) |
| *H02S 20/32* | (2014.01) |
| *H02S 30/10* | (2014.01) |
| *H02S 30/20* | (2014.01) |
| *H02S 40/30* | (2014.01) |
| *H02S 40/32* | (2014.01) |
| *H02S 40/38* | (2014.01) |
| *F21W 131/10* | (2006.01) |

(52) U.S. Cl.
CPC .............. *H02S 20/30* (2014.12); *H02S 20/32* (2014.12); *H02S 30/10* (2014.12); *H02S 30/20* (2014.12); *H02S 40/30* (2014.12); *H02S 40/32* (2014.12); *H02S 40/38* (2014.12); *F21S 8/08* (2013.01); *F21W 2131/10* (2013.01); *Y02B 20/72* (2013.01); *Y02E 10/50* (2013.01)

(56) References Cited

U.S. PATENT DOCUMENTS

| | | | |
|---|---|---|---|
| 7,709,727 | B2 | 5/2010 | Roehrig et al. |
| 8,833,985 | B2 | 9/2014 | Orff et al. |
| 2008/0196758 | A1* | 8/2008 | McGuire ................ F03D 9/007 136/245 |
| 2011/0047891 | A1 | 3/2011 | Andretich et al. |
| 2011/0176256 | A1 | 7/2011 | Van Straten et al. |
| 2012/0080072 | A1 | 4/2012 | Bullivant et al. |
| 2014/0125134 | A1* | 5/2014 | Van Straten ........... H02S 30/20 307/72 |
| 2015/0280489 | A1 | 10/2015 | Curlett |
| 2015/0300321 | A1* | 10/2015 | Haar ...................... F03D 3/005 206/223 |

OTHER PUBLICATIONS

International Preliminary Report on Patentability issued in corresponding International Application No. PCT/US2016/061585, dated May 24, 2018.

\* cited by examiner

MODULAR PHOTOVOLTAIC LIGHT AND POWER CUBE

CROSS-REFERENCE TO RELATED APPLICATIONS

This application claims the benefit of priority to U.S. Provisional Patent Application No. 62/254,997 filed Nov. 13, 2015, the disclosure of which is incorporated herein by reference in its entirety.

BACKGROUND

Many operations in a variety of settings function during the dark hours of the day where activities could not proceed without adequate light. Construction, military operations, facilities management and maintenance operations, parties and special events, athletic events, emergency response, and industrial operations are a few examples. Fixed and mobile light sources are two options that can help to illuminate the setting. Fixed lighting is often characterized by streetlights, area lighting in the form of flood lights, or other permanent structures that are connected to an electric utility and operate off of traditionally delivered electric power. Mobile solutions include trailer mounted gas or diesel powered lights, as well as trailer mounted lights powered with alternative energy.

Infrastructure limitations to fixed lighting require that each site to be lit be hardwired to the utility in order to function, a requirement which may mandate continual use of the same site to justify the time and expense of such an installation. This often does not meet the needs of the activity. Mobile lighting in various forms may be moved to accommodate the location and timing of the activity, and may be temporary in nature; however, can be expensive and loud to run, as well as can impose environmental ramifications as a result of emissions from the system. Mobile options, while easy to transport individually, do not allow for efficient use of limited deck space on a tractor trailer or cargo space in a shipping container or other cargo transport in order to ship maximum multiple units at one time.

The incorporation of a trailer base into a mobile light tower adds wheels and fenders to the mobile light tower, an addition that may introduce adverse effects while having no positive impact on performance capabilities. The use of wheels makes the unit more unstable during transport, thus requiring a more secure and labor intensive restraint system. The addition of wheels and fenders as well as the requisite tow bar and hitch on the front of the mobile units that define the present art add width and length to the light tower. The stowed mast and light assembly projecting from the back of the current mobile units add more length and further impede packing and shipping, and therefore impose significant limitations on the quantity of light towers that can be shipped, also significantly increasing the time and difficulty required to load mobile light towers. The additional design challenges created by an exposed light assembly and solar panels to an already inefficient footprint produce an even more cumbersome and fragile package. Also, using rubber tires as a foundation of a mobile light tower increases the maintenance regimen and wear and tear on the unit. It also introduces the vulnerability of having a worn or damaged tire render the unit inoperable.

Designing a light tower on a trailer base creates the need for driving, directional and brake lights, and the associated wiring. They require a unique DOT administered VIN and, therefore, a title. Many states require a light tower to be registered and assigned a state license plate, which is renewed annually.

Mobile lighting units powered by renewable energy sources offer power only to the on board light fixtures, denying users the ability to power other devices such as phones, computers, small electrical tools, or other electrically powered devices directly from the unit.

SUMMARY OF THE INVENTION

There remains a need in the market for a compact modular unit powered by renewable energy that is portable but stationary, robust in design so as to withstand rigorous use and transport, able to be tightly packed and stacked to meet shipping and storage needs, compact so as to fit more units in a single transport carrier, and with area and directional lighting capability as well as AC and DC power delivery capability for use powering other electrical devices external from the module.

Accordingly, the present invention is directed to modular photovoltaic light and power cube that obviates one or more of the problems due to limitations and disadvantages of the related art.

An advantage of the present invention is to provide a solar powered energy generation module, comprising a first plurality of rails forming a base perimeter and defining a footprint of a support structure; at least two openings extending laterally one rail of the first plurality of rails; at least two stabilizer rails extending through at least two corresponding ones of the first plurality of rails; vertical posts extending perpendicularly from the first plurality of rails; a second plurality of rails forming an upper platform and extending perpendicularly from the vertical posts; an upper platform comprising upper rails above the frame support structure corner posts positioned near intersections of two of the plurality of rails; and at least one mounting frame comprising a solar panel array; the at least one mounting frame connected to the upper platform via by an articulating means to provide a range of motion for the mounting frame with respect to the upper platform.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, in one embodiment, A power generation device comprising a plurality of solar powered energy generation modules, each module of the plurality in electrical communication with another of said modules, each module comprising a first plurality of rails forming a base perimeter and defining a footprint of a support structure; at least two openings extending laterally one rail of the first plurality of rails; at least two stabilizer rails extending through at least two corresponding ones of the first plurality of rails; vertical posts extending perpendicularly from the first plurality of rails; a second plurality of rails forming an upper platform and extending perpendicularly from the vertical posts; an upper platform comprising upper rails above the frame support structure corner posts positioned near intersections of two of the plurality of rails; at least one mounting frame comprising a solar panel array; the at least one mounting frame connected to the upper platform via by an articulating means to provide a range of motion for the mounting frame with respect to the upper platform; and a DC/AC inverter.

In another aspect of the present invention, another embodiment of the method according to principles of the present invention includes deploying a solar powered energy generation module, comprising inserting a material handling rail into an opening in a base of the solar generation module and moving the module using the material handling rail so that the module comprising at least one solar array so that the solar array faces south; removing the material handing rail from the opening; extending stabilizer rails from the modules; extending a mast from the module to a desired height; turning the mast assembly on a rotating base to a desired direction; and deploying the at least one solar array.

The details of one or more embodiments of the disclosure are set forth in the accompanying drawings and the description below. Other features, objects, and advantages of the disclosure will be apparent from the description and drawings, and from the claims.

BRIEF DESCRIPTION OF THE DRAWINGS

The accompanying figures, which are incorporated herein and form part of the specification, illustrate the modular photovoltaic light and power cube of the present invention. Together with the description, the figures further serve to explain the principles of the modular photovoltaic light and power cube described herein and thereby enable a person skilled in the pertinent art to make and use the modular photovoltaic light and power cube.

DETAILED DESCRIPTION

Figure 1:
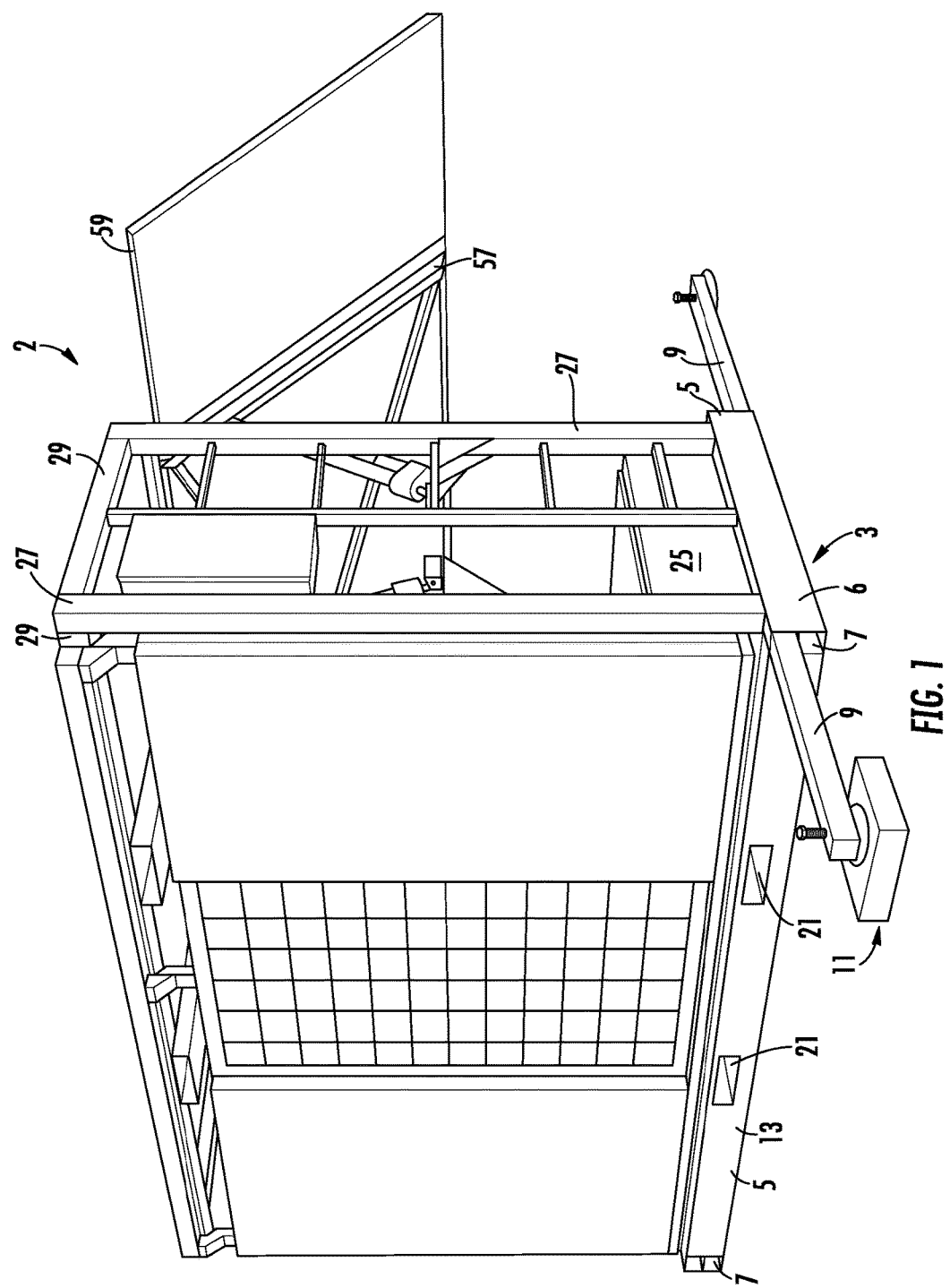
FIG. 1 is an isometric view of modular light tower showing ladder, control box side and extended outriggers. One panel array unfolded and extended, one panel array stowed

Reference will now be made in detail to embodiments of the modular photovoltaic light and power cube with reference to the accompanying figures, in which like reference numerals indicate like elements.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The following description of certain examples of the inventive concepts should not be used to limit the scope of the claims. Other examples, features, aspects, embodiments, and advantages will become apparent to those skilled in the art from the following description. As will be realized, the device and/or methods are capable of other different and obvious aspects, all without departing from the spirit of the inventive concepts. Accordingly, the drawings and descriptions should be regarded as illustrative in nature and not restrictive.

For purposes of this description, certain aspects, advantages, and novel features of the embodiments of this disclosure are described herein. The described methods, systems, and apparatus should not be construed as limiting in any way. Instead, the present disclosure is directed toward all novel and nonobvious features and aspects of the various disclosed embodiments, alone and in various combinations and sub-combinations with one another. The disclosed methods, systems, and apparatus are not limited to any specific aspect, feature, or combination thereof, nor do the disclosed methods, systems, and apparatus require that any one or more specific advantages be present or problems be solved.

Features, integers, characteristics, or groups described in conjunction with a particular aspect, embodiment or example of the invention are to be understood to be applicable to any other aspect, embodiment or example described herein unless incompatible therewith. All of the features disclosed in this specification (including any accompanying claims, abstract, and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract, and drawings), or to any novel one, or any novel combination, of the steps of any method or process so disclosed.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal aspect. "Such as" is not used in a restrictive sense, but for explanatory purposes.

The modular photovoltaic light and power cube disclosed herein meets the need for a variable and or high intensity, directional, energy efficient light source that can be supported by a robust energy storage system and powered by renewable solar energy. Recent improvements in the lumens per watt output of high intensity lights such as light emitting diode (LED), compact fluorescent or induction or plasma lamps have increased the light output and decreased the power input to the point that moderately sized solar arrays and properly sized power storage systems can provide the energy needed to support a reliable, sustainable source of high intensity light.

This new technology can, in many instances, supplant the existing source of temporary portable light currently being supplied by diesel powered light towers. By replacing the older combustion engine powered technology, the modular photovoltaic light and power cube not only eliminates the need for fossil fuel and the resulting carbon and other emissions and pollutants that carbon based fuels produce, it also eliminates the noise pollution produced by the combustion engine and the light pollution caused by metal halide bulbs in broad cast reflector housings.

Generally, the light and power cube refers to a cube or rectangular prism-like structure which may contain a battery based energy storage system powered by a retractable folding array(s) of solar panels and from which may extend a telescoping or folding mast fixed with a quantity of light fixtures which can be individually adjusted to direct light to the desired area or areas to be illuminated. In addition to the supply of reliable, sustainable light, the light and power cube may be equipped with a DC/AC power inverter to supply a reliable source of 110 v or 220 v AC power to support additional electronic components. The light and power cube can also have a 110 v or 220 v input, DC output, on board battery charger to provide a secondary means of charging the battery bank. As used herein, the terms "light and power cube" and "module" are used interchangeably.

The light and power cube meets the needs in the art with a modular design allowing the module or quantities of modules to be shipped or stored or deployed with greater efficiency and at less cost than the prior art technology, enabling the modules to be tightly packed and or stacked in various configurations for more compact and flexible storage, shipping, and deployment options.

By enabling both the solar panel arrays and telescoping or folding mast supported light assembly to retract within the planar boundaries defined by the elongated light and power cube, the external structure of the module creates its own protective enclosure for shipping or other purposes, negating the need for secondary protection. Additionally, the module base structure can offer a much larger area of contact with the ground, unlike the extended, unstable point loading present in the outrigger and jack stand support structures of the prior art. The option to ship, store, or deploy the modules without wheels also eliminates the maintenance and replacement costs of tires and the down time caused by damaged tires. The photovoltaic array(s) that may accompany the module structure may extend, slide, or unfold from the compact stored position to increase the photovoltaic surface area, and retract, slide, or fold into a stored position within or in close proximity to the module frame or skeleton. The photovoltaic array may provide power to a battery or batteries which store power for use powering the lights and/or the electric distribution center. There may be a backup on-board alternative power generation system for use when batteries run low for a variety of reasons to ensure continued usefulness of the module as a lighting and/or power device.

The modular light and power cube may be fitted with a retractable mast upon which lights, communication devices, cameras or other equipment may be mounted. When retracted, the mast and light assembly will store below the protective grating or other hard surface which will cover the entire upper area of the cube. On models with no upper deck surface, the mast and light assembly will retract within the planer boundaries of the structure. This upper deck surface can also act as a platform for access to the light assembly or for securing a four point lifting sling to the attachment points at or near the corners of the upper deck for crane mobilization. The upper deck may be fitted with a grated hatch mounted to the top of the light assembly which can raise with the mast to allow a portal through the upper deck for the telescoping or folding mast to pass through when the light assembly is raised for operation, and to cover the opening when the mast is retracted. Alternatively, the hatch can be hinged to the deck and opened to allow mast extension and closed after mast extension to cover the portal. When in use, the light mast may extend through the deck to a height of from 1 to 30 feet. The mast may be designed using a series of gradually decreasing diameter concentric hollow tubes which store inside each other when retracted, and each projecting above and supported by the section below when extended. The mast may also be a series of vertical panels interconnected with rolling or sliding tracks that can be extended by pistons, gears or cables in a manner similar to a multistage extension ladder, or can be another mechanical load bearing device capable of raising a device(s) or instrument(s) to a height conducive to module operation. Light is emitted through one or more high efficiency light sources such as LED, induction lights, compact fluorescent, or similar.

The module design accommodates multiple modes of lifting, moving, stacking, or deployment. On the bottom rail and accessible from either side of the module there may be structural steel or other material ports or pockets of some dimension allowing for the insertion of lifting or moving equipment that may be a forklift, chains, steel, or some other lifting or moving device. Similar pockets may exist in or under the top rails of the module to enable lifting from above the module's center of gravity by fork or sling or other lifting or moving device. Other ports similar in nature may exist at other points on the frame of the module. There also may be placed hooks, eyes, or other means of lifting or securing the module for movement, shipping, storage, or deployment.

The module may be secured to a surface in multiple modes by welding, bolting, or otherwise attaching the base permanently or semi permanently to a surface. The outer rails may be welded, screwed, bolted, attached with angle brackets, tied down, strapped, or otherwise secured to barges, derricks, platforms or other work surfaces where there is a long or short term need or potential for the module to shift under excessive or unpredictable forces.

Figure 2:
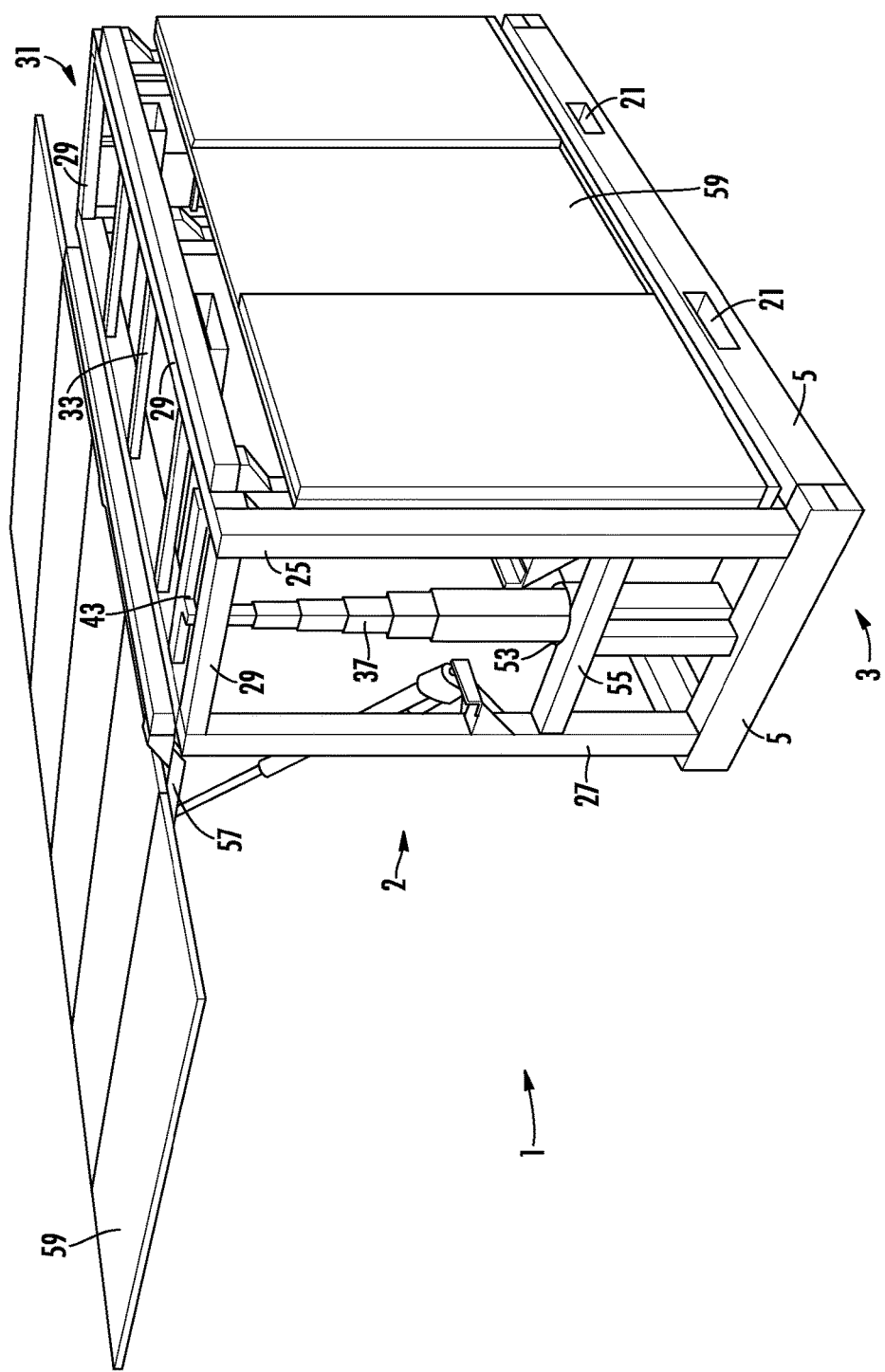
FIG. 2 is an isometric view showing telescoping mast side (missing winch) and upper rail support structure (grating removed) solar panel frame hinge and actuators.
Figure 3:
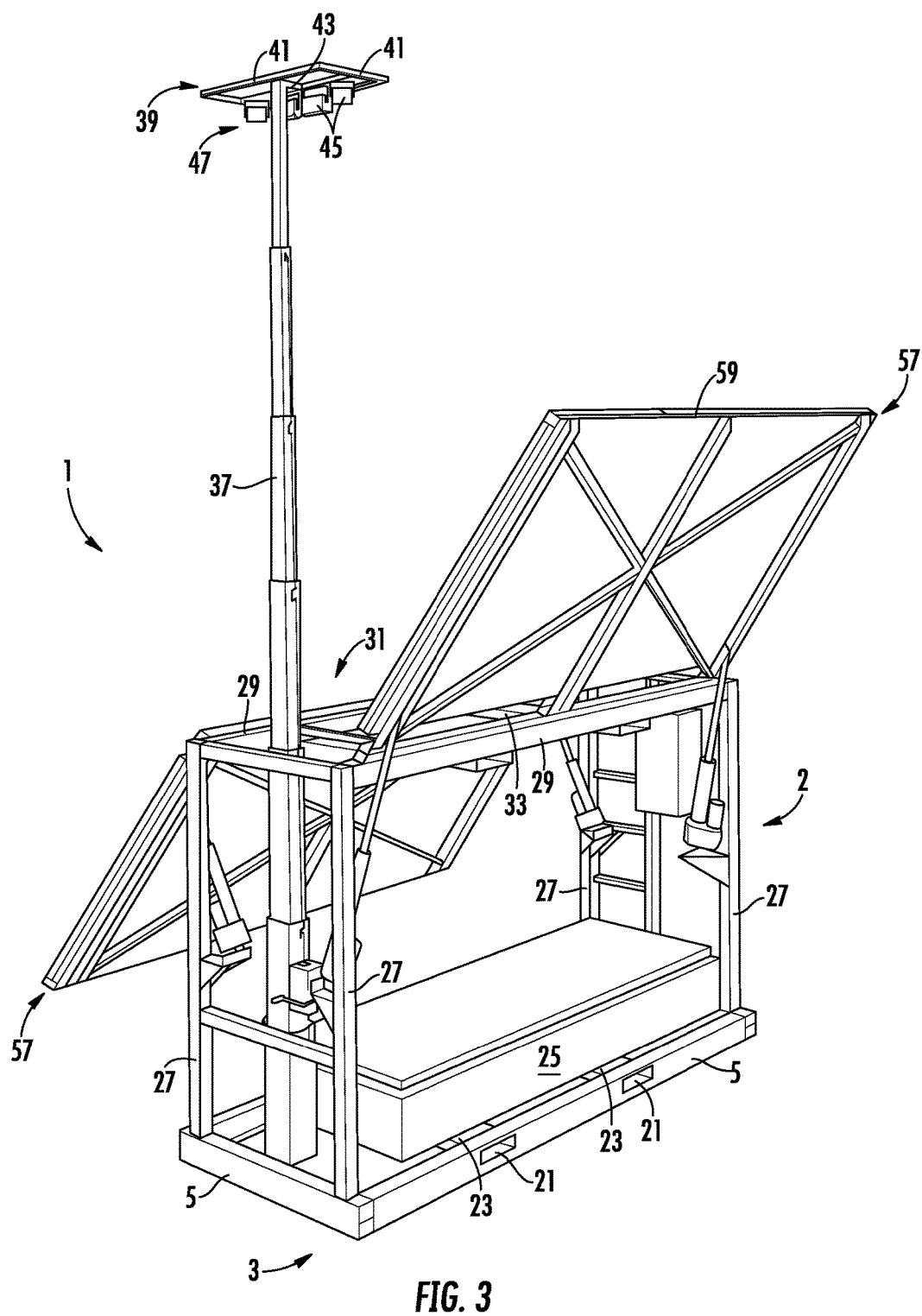
FIG. 3 is an isometric view showing both solar panel arrays extended but folded, light mast extended with light assembly at height and battery enclosure

In the embodiment shown in FIGS. 1-3, the modular light and power cube includes a cube or rectangular prism shaped open frame support structure 2 having a planar base 3. The base is constructed of four or more base rails 5 forming the perimeter of the base and defining its footprint. Each of the shorter rails 6 of the base perimeter can be fabricated by stacking two hollow tubes and welding or otherwise securing them together to form a two bay rectangular tube. Inserted in each of the four bays 7 are four slightly narrower stabilizer rails 9, which may be hollow tubes, bars, beams or structural members of a similar length that can be extended out of the hollow bays 7 on all four corners of the base 3. The stabilizer rails 9 can act as stabilizers or outriggers by significantly increasing the lateral footprint of the base 3 when deployed. To the outer ends of each of the stabilizer rails 9 can be attached an adjustable foot 11 that can be lowered to make contact with the ground or other load bearing material to transfer loading forces. To the stacked sides of the short rails 6 and flush with each end are attached the long base rails 13, which may consist of heavy gauge C-channel, structural steel or other material, and are oriented so that the web forms the outer surface of the long base rail 13 and the upper and lower flanges are oriented to the interior of the base. In the area just under the upper flange of the long base rail 13 and equidistant from the vertical centerline and each of its ends can be cut two rectangular openings 21 into each long base rail 13. These openings 21 should be patterned to allow for minimal clearance for rectangular lifting tubes 23 to be passed through the two corresponding openings 21 in each of the two long rails 13. These two lifting tubes 23 should be the same length as the short rails 6 to enable flush welding of the edges of the tubes to the perimeter of the cut out opening. The attached rectangular lifting tubes 23 should be of sufficient height and width to allow insertion of forklift forks of moderate size to facilitate forklift handling of the module. The two lifting tubes 23 also act as the load bearing surface for the battery enclosure 25, which is mounted to the surface of each and within the perimeter of the base.

Additionally, to the base 3 are connected, at or near each of the four corners of the base, four corner posts 27. These provide support for the upper rails 29 and upper platform 31 and protection to the components housed within the perimeter of the module when not in use.

Still referring to FIGS. 1-3, the protective structure may be shielded from above with an upper platform 31 which may be grated or solid, which consists of four upper rails 29 connected to the four corner posts 27 that form the perimeter frame of the upper platform 31. At various locations across the width of the frame can be placed lateral braces 33 which act as additional support for the grating, grid work or other hard surface, if so provided, that can create an accessible work platform and protection for the components below the surface. At or near the four opposing corners of this upper platform 31 are lifting points which may provide connections for a 4 point lifting cable, sling or other handling device. These lifting points may also act as stacking alignment fixtures, to provide proper transfer of bearing load on lower units when stacked in storage. This surface may allow for personnel to sit, stand, work or otherwise access the top of the module for the purpose of servicing or adjusting the light fixtures, attaching or detaching a lifting device from the lifting points or other functions as they become evident.

In the area of the upper deck directly above the telescoping or foldable mast 37 can be located a removable or hinged hatch cover 39. This hatch cover may be constructed of four solid or tubular steel sides 41 and covered with a grating material similar to that which is used to surface the fixed upper platform 31 from which the hatch cover 39 may be removed or opened. Additionally, the hatch cover 39 may be attached to the top of the light bar 43 which itself may be connected to the top of the telescoping mast 37 and from which the individual light fixtures 45 are attached. This method of mounting will allow the hatch cover 39 to form part of the upper platform 31 when the mast 37 is retracted and allows the mast mounted light assembly 47 to pass through the upper platform 31 unobstructed when the telescoping mast 37 extends the light assembly 47 to operating height. In the case of a hinged hatch, the hatch can have a cut out to allow it to be closed after mast deployment without being impeded by the extended mast.

The mast 37, to which the light assembly 47 may be attached at its uppermost end, may be mounted at its base by a spindle bolt and base plate support, or other rotating base mechanism which allows the mast to rotate along its vertical axis. A fixed mast may also be an option, and the capability of rotating the light assembly may be accomplished by incorporating a rotating mechanism or structure to the upper mast and or light assembly to adjust the orientation of the lights or other mounted device(s) or instrument(s). The rotating mast may be additionally supported at a sufficient distance above the base assembly 3 by a cylindrical collar 53 fixed to a support brace 55 which is itself fixed to the corner posts 27 located on either side of the mast assembly. Within this collar may be located the lowermost rotating mast section to which may be fixed a smaller cylindrical bearing surface placed around this mast section and positioned concentrically within the secured outer collar 53 to create a stabilizing structure capable of allowing mast rotation through the support. To the outer collar 53 can be attached a threaded or other type of nut, through which a threaded or other type of bolt can be screwed which can bear on the inner concentric ring to act as a locking mechanism when tightened, to prevent unwanted mast rotation once the light orientation is selected. Also mounted to the lowermost mast section may be a winching or lifting mechanism. This device raises the mast using cables, pistons or other mechanical means which through applied mechanical force raises the series of interconnected mast sections to carry the light assembly, cameras, antennas or other device to the elevation desired for operation.

Still referring to FIGS. 1-3, at or near the top of the two opposing long sides of the open frame support structure may be two retractable solar panel mounting frames 57 attached by hinges or other attaching mechanism. To these frames are mounted solar panel arrays 59 that may be expanded to increase the solar surface area of the arrays and pivoted along the horizontal axis to orient the surface of the arrays for optimum solar gain. The solar array (and mounting frame) may be retracted (or collapsed) to the side of the base for storage such that the base with the solar arrays forms a generally rectangular prism or cube. The operation of expanding the solar array 59 can be performed using hinges, roller mechanisms, or sliding tracks to expose additional panels in order to increase the surface area for power generation when deployed, and to reduce the surface area for storage, transport, or other movement. The operation of pivoting the solar arrays 59 through their range of motion may be performed using actuators, cam levers, gear drives or other mechanical lifting mechanism and powered manually or by the on board power supply and controlled by switches or other device(s) to direct the motion to extend or retract the solar arrays to the desired position. The control switches, light, or other device activation timers, breakers, and other electrical components required for the transfer, activation, interruption, or other conditioning or manipulation of the power storage and transmission process can be located in control boxes mounted in convenient locations within the confines of the structure. For long term deployment or in high wind conditions, the solar arrays can be secondarily supported by adjustable locking braces which can be anchored to the base and connected to the solar panel frame and designed to reduce the stress loading on the primary lifting mechanism by external forces.

The power generated by the solar panel arrays 59 can be combined and optimized through a charge controller(s) or other voltage regulating device, and stored in a battery bank or other power storage system. The array may also be optimized through the use of DC power optimizers or similar device. The stored power can be used as needed by the light assembly, cameras, or other devices mounted on the telescoping mast or electronic components, device charging cabinets or other equipment housed in other areas of the module, as well as to DC to AC power inverters which can provide a reliable, renewable AC power supply for operating external or auxiliary electrical tools, machines, devices or facilities. The power for the lights or other electrical devices can be activated and terminated manually as needed, or by clock timers or other similar load control device. These timers may be programmed to turn devices on and off automatically using times of the day, days of the week, or a combination of other criteria to define the parameters of operation and can be activated manually for on demand operation. An on board battery charger may be installed to provide the ability to recharge the power storage system when the panels are retracted or shaded or in the event that solar power generation is insufficient to supply the energy needed to fully charge the system or to sustain the rate of power consumption independently.

In applications where demand loads are greater than one module is capable of supplying, modules can be interconnected to combine the power generation, storage and distribution capabilities of multiple units to create larger portable power supplies. The power generated by the on board DC/AC inverter in each power cube is limited by the capacity of the modules battery bank. By combining multiple power cube battery banks through a series of parallel interconnected (+) to (+) and (−) to (−) bus cables, and transferring the power of the much larger battery grid through two trunk lines to the optional remote DC/AC power inverter, the combined power reserve can supply a much larger or longer duration demand load.

Power generation from the solar panel arrays to the battery banks in an interconnected power cube station is incrementally supplied by each modules arrays to its dedicated battery bank independently of the other power cubes in the parallel system.

Supplemental or alternative power generation for battery charging or load support can be applied incrementally using the on board battery charger wired to each individual battery bank. Using the existing battery charging systems, each of the interconnected modules should be connected to a power source for uniform battery recharging. Alternatively, a supplemental source of power can be applied through the optional remote inverter/charger console, such as a generator or other alternative power supply, which will recharge the entire combined battery bank as a single entity.

In an exemplary embodiment, a solar powered energy generation and storage module comprises a cuboid or rectangular prism shaped open frame support structure. The frame support structure includes a base composed of base rails forming the perimeter of the base and defining the footprint of the structure. Corner posts are connected at or near the corners of the base, which provide support for the upper platform and protection to the components housed within the module. An upper platform is composed of upper rails that form the perimeter of the upper platform and provide a support frame for a grated, gridwork or other hard surface providing access to the light assembly or other device for adjustment and/or maintenance and a work structure from which to connect lifting gear or other devices to the structure for mobility from a crane or other overhead lifting or mobilization means, or for securing the module. The upper platform protection of components located below or within the protective surface. The upper platform includes a mast portal through which the telescoping mast can pass when extended. The system further includes a protective crate-like module when the various components, such as the solar panel arrays, telescoping mast, and light assembly or outriggers of the device are retracted to where the boundaries may be defined by the perimeters of the cube or prism, which may then be packed or stored side to side and/or end to end with no unused space, and may additionally be stacked one on top of the other 2 or 3 or more than 3 modules high. Solar panel arrays, which absorb and convert solar energy to electrical energy for use or storage for later use, are mounted on adjustable solar panel mounting frames on the side(s) or other areas of the open frame support structure, and may be expanded to increase the surface area or change the incident angle of the solar array, and also may be adjusted in order to maximize exposure and solar input, or for other reasons. The system further includes a power storage system designed to store power generated by the photovoltaic modules or other electricity generating device(s) for immediate or later use and electrical power conditioning, control, distribution and generation device(s) which are used to modify, direct and regulate the energy as energy travels from the solar panel arrays to the power storage system and to internal or external electrical devices and from alternative energy generation devices to the power storage system for demand loads or secondary charging capability.

It is contemplated to interconnect multiple modules to increase the power generation, storage and distribution characteristics of the whole for demand loads beyond the capabilities of a single unit.

A telescoping or extending mast assembly is housed within the open frame support structure when retracted and may be fixed with a hatch cover at its upper end to seal the mast portal in the upper platform when the mast is retracted. The system may include a mounting location for attaching a number of high efficiency light fixtures which can be raised to the desired height for illumination of a selected area, or other device(s) such as a camera, antenna or other instrument or device which would benefit the module by being raised to a height.

The solar powered light tower according to principles of the present invention may be positioned using a forklift, crane, trailer or other material handling device, orient the module so that either of the solar wing sides is facing due south. Next the four stabilizer rails or outriggers 9 are manually extended from within the stacked hollow tubes which make up the front and back base rails. The adjustable feet or outrigger jacks 11 attached to the extended tips of the stabilizer rails 9 are extended until they make load bearing contact with the ground. The mast mounted lights are adjusted to the desired orientation by turning each light bracket mounted on the light bar to the correct bearing and pivoting the light within the bracket to the correct incident angle. All lights can be adjusted in this manner to provide single point concentrated area lighting, multi-point security or event lighting or broad cast 360° lighting for parking lot or other large area general lighting.

On modules fitted with hinged mast portal doors, the portal door in the upper deck above the mast is opened prior to extending the mast 37. On models with the portal cover incorporated into the top of the light bar on the mast 37, the mast 37 is extended to the desired height using the winch located at the base of the mast 37. The mast winch may be manual or electric and will require either turning the winch handle for manual deployment, or activating the extend/retract button on the electric winch control.

The mast assembly is turned on its rotating base as a further means of adjusting the bearing direction of the light assembly 47 mounted to the top of the mast 37 and locked in place using a compression lock found on the support collar 53.

The retaining mechanisms holding the extendable solar panels in the folded (stored) position is unsecured and the extendable solar panels are deployed and secured so that the full solar array 59 is exposed for operation.

The angle of each solar wing is adjusted using the extend/retract buttons powering the electric piston actuators, which control the orientation of the solar arrays 59. The wings should both be directed to the angle from the horizon where the sun will be at noon. With the wings bearing south and angled to the sun's height at noon, the panels are adjusted for maximum solar gain.

The lights may be turned on and off manually, or operated automatically with timer controls or other load control devices. Light/load timers can be multi-function clock timers programmed to turn on and off at various times through the night and at different nights for different times throughout the week.

A power cube according to principles of the present invention may be positioned using a forklift, crane, trailer or other material handling device, orient the module so that either of the solar wing sides is facing due south. The four stabilizer rails or outriggers are manually extended from within the stacked hollow tubes which make up the front and back base rails. The adjustable feet or outrigger jacks are extended and attached to the extended tips of the stabilizer rails until they make load bearing contact with the ground. Retaining mechanisms holding the extendable solar panels in the folded (stored) position are unsecured and the extendable solar panels are deployed and secured so that the full solar array is exposed for operation. The angle of each solar wing is adjusted using the extend/retract buttons powering the electric piston actuators which control the orientation of the solar arrays. The wings should both be directed to the angle from the horizon where the sun will be at noon. With the wings bearing south and angled to the sun's height at noon, the panels are adjusted for maximum solar gain. Load timers can be multi-function clock timers programmed to turn on and off at various times through the night and at different nights for different times throughout the week to control the mast mounted lights or other loads that would benefit from an automated power supply. The DC/AC power inverter in the power distribution panel located on the rear of the module is activated. The ac load or an extension cord which powers a remote power distribution box containing multiple power outlets may be plugged into the power inverter, which is configured to accommodate both 110 v and 220 v loads. The power distribution panel may contain AC breakers for circuit overload protection. The DC/AC inverter is powered by the battery bank and will disconnect the load when the battery bank reaches a predetermined low voltage disconnect setting. The module's battery bank can be recharged while under load, either directly by solar input, wind turbine or other DC power source, or through the onboard battery charger, powered by an AC power source, such as a fuel cell, combustion engine powered generator or other power generation device.

Additionally, an alternative power generation system may be installed to produce energy in addition to or instead of the PV solar power generation system. This system can be a wind turbine or fuel powered generator, such as a diesel, gasoline, hydrogen, LP, natural gas or other combustible material, and can produce either AC or DC electricity to recharge the power storage system and or power the lights or other demand loads placed on the module. This hybrid power combination would insure the production of a reliable uninterrupted power supply.

In applications where demand loads are greater than one module is capable of supplying, modules can be interconnected to combine the power generation, storage and distribution capabilities of multiple units to create larger portable power supplies.

While various embodiments of the present invention have been described above, it should be understood that they have been presented by way of example only, and not limitation. It will be apparent to persons skilled in the relevant art that various changes in form and detail can be made therein without departing from the spirit and scope of the present invention. Persons of ordinary skill in the art will understand that a wide variety of suitable supporting structures and patterns can be readily formed. Any number of longitudinal stiffening ribs or circular ribs could be provided. Thus, the breadth and scope of the present invention should not be limited by any of the above-described exemplary embodiments, but should be defined only in accordance with the following claims and their equivalents.

What is claimed is:

1. A solar powered energy generation module, comprising:
    a first plurality of rails forming a base perimeter and defining a footprint of a support structure; at least two openings extending laterally into one rail of the first plurality of rails;
    at least two stabilizer rails extending through at least two corresponding ones of the first plurality of rails;
    vertical posts extending perpendicularly from the first plurality of rails;
    a second plurality of rails forming an upper platform and extending perpendicularly from the vertical posts;
    at least one mounting frame comprising a solar panel array; the at least one mounting frame connected to the upper platform by an articulating means to provide a range of motion for the at least one mounting frame with respect to the upper platform;
    a telescoping mast comprising a vertical axis and at least one of a light, a communication transmitter, a communication receiver, an antenna, or a camera attached to an upper portion of the telescoping mast, wherein the telescoping mast is extendable to a first vertically oriented position above the upper platform and retractable to a second vertically oriented position below the upper platform and within the boundaries of the support structure defined by the first plurality of rails, the second plurality of rails, and the vertical posts;
    a hatch cover attached to an upper end of the telescoping mast and extending outwardly from the telescoping mast in a direction perpendicular to the vertical axis, wherein the hatch cover forms a part of the upper platform when the telescoping mast is retracted to the second vertically oriented position,
    a rotating base mechanism attached at a base of the telescoping mast, the rotating base mechanism enabling adjustments to the height of the telescoping mast and enabling rotation of the telescoping mast about the vertical axis; and
    a locking mechanism attached to the telescoping mast, the locking mechanism configured to prevent mast rotation about the vertical axis when in an activated configuration.

2. The solar powered energy generation module of claim 1, further comprising a winch operatively connected to the mast for adjusting the height of the telescoping mast and a rotation direction of the telescoping mast.

3. The solar powered energy generation module of claim 1, wherein the articulating means includes at least one of a hinge, roller or sliding track.

4. The solar powered energy generation module of claim 1, further comprising an actuator connected to the articulating means for adjusting a position of the articulating means to a desired position.

5. The solar powered energy generation module of claim 1, wherein the first plurality of rails include a pair of long rails and a pair of short rails, wherein the short rails are attached to the long rails to form a rectangular shaped base perimeter.

6. The solar powered energy generation module of claim 5, wherein the short rails each comprise at least two hollow tubes secured to form a rectangular tube comprising two bays.

7. The solar powered energy generation module of claim 6, wherein the stabilizer rails are inserted into the bays.

8. The solar powered energy generation module of claim 1, further comprising a plurality of adjustable feet, the feet each corresponding to a respective end of one of the stabilizer rails.

9. The solar powered energy generation module of claim 1, further comprising one or more batteries.

10. The solar powered energy generation module of claim 1, further comprising a DC/AC inverter.

11. A power generation device comprising a plurality of solar powered energy generation modules, each module of the plurality in electrical communication with another of said modules, each module comprising:
- a first plurality of rails forming a base perimeter and defining a footprint of a support structure; at least two openings extending laterally into one rail of the first plurality of rails;
- at least two stabilizer rails extending through at least two corresponding ones of the first plurality of rails;
- vertical posts extending perpendicularly from the first plurality of rails;
- a second plurality of rails forming an upper platform and extending perpendicularly from the vertical posts;
- at least one mounting frame comprising a solar panel array; the at least one mounting frame connected to the upper platform by an articulating means to provide a range of motion for the at least one mounting frame with respect to the upper platform;
- a telescoping mast comprising a vertical axis and at least one of a light, a communication transmitter, a communication receiver, an antenna or a camera attached to an upper portion of the telescoping mast, wherein the telescoping mast is extendable to a first vertically oriented position above the upper platform and retractable to a second vertically oriented position below the upper platform and within the boundaries of the support structure defined by the first plurality of rails, the second plurality of rails, and the vertical posts;
- a hatch cover attached to an upper end of the telescoping mast and extending outwardly from the telescoping mast in a direction perpendicular to the vertical axis, wherein the hatch cover forms a part of the upper platform when the telescoping mast is retracted to the second vertically oriented position,
- a rotating base mechanism attached at a base of the telescoping mast, the rotating base mechanism enabling adjustments to the height of the telescoping mast and enabling rotation of the telescoping mast about a vertical axis of the telescoping mast;
- a locking mechanism attached to the telescoping mast, the locking mechanism configured to prevent mast rotation about the vertical axis when in an activated configuration; and
- a DC/AC inverter.

12. The solar powered energy generation module of claim 5, wherein each of the at least two openings extend laterally through one of the long rails at a position spaced from an end of the long rail and at an angle perpendicular to a longitudinal axis of the long rail.

13. The power generation device of claim 11, wherein the first plurality of rails include a pair of long rails and a pair of short rails attached to the long rails to form a rectangular shaped base perimeter, and wherein each of the at least two openings extend laterally through one of the long rails at a position spaced from an end of the long rail and at an angle perpendicular to a longitudinal axis of the long rail.

14. The solar powered energy generation module of claim 1, wherein the upper platform further comprises four opposing corners and lifting points positioned at or near the four opposing corners, and wherein the lifting points provide connections for a lifting cable, sling, or other handling device.

15. The solar powered energy generation module of claim 14, wherein the lifting points act as stacking alignment fixtures.

16. The power generation device of claim 11, further comprising a winch operatively connected to the mast for adjusting a height of the telescoping mast and a rotation direction of the telescoping mast.

17. The power generation device of claim 11, further comprising an actuator connected to the articulating means for adjusting a position of the articulating means to a desired position, wherein the articulating means includes at least one of a hinge, roller or sliding track.

18. The power generation device of claim 11, further comprising a plurality of adjustable feet, the feet each corresponding to a respective end of one of the stabilizer rails.

19. The power generation device of claim 11, further comprising one or more batteries.

* * * * *